United States Patent [19]
Ries

[11] 4,255,232
[45] Mar. 10, 1981

[54] METHOD FOR DRYING SLUDGE

[75] Inventor: Walter Ries, Bad Mergentheim, Fed. Rep. of Germany

[73] Assignee: Braunschweigische Maschinenbauanstalt, Brunswick, Fed. Rep. of Germany

[21] Appl. No.: 953,191

[22] Filed: Oct. 13, 1978

[30] Foreign Application Priority Data

Oct. 22, 1977 [DE] Fed. Rep. of Germany ....... 2747506
Aug. 16, 1978 [DE] Fed. Rep. of Germany ....... 2835916

[51] Int. Cl.³ .............................................. B01D 1/00
[52] U.S. Cl. ............................... 159/47 R; 159/16 R; 159/8; 159/6 W
[58] Field of Search ..................... 159/47, 16 R, 16 S, 159/25 R, 25 A, 8, 9 A, 9 R, 6 W, 6 WH; 208/187, 188; 44/1 D, 1 R

[56] References Cited

U.S. PATENT DOCUMENTS

| | | | |
|---|---|---|---|
| 803,051 | 10/1905 | Edson et al. | 159/25 R |
| 2,284,272 | 5/1942 | Franklin et al. | 208/187 |
| 3,842,052 | 10/1974 | Gordini et al. | 159/16 S |

*Primary Examiner*—Norman Yudkoff
*Attorney, Agent, or Firm*—W. G. Fasse; D. F. Gould

[57] ABSTRACT

Pasty, aqueous sludges of industrial or sewage treatment origin are dried for further use as raw material. The sludge particles are loosened by intense motion and substantially dry gases are introduced under pressure into the loosened sludge. The moisture enriched gases are removed from the sludge. The loosening and drying may be facilitated by repeatedly and sequentially increasing and decreasing the total surface area of the sludge. The intense motion is imparted to the sludge by at least one sludge stirring member and the drying gases may be introduced through the stirring member. The surface area of the sludge may be increased by plough-shaped or scraper-shaped tools. The surface area of the sludge may be decreased by rollers.

11 Claims, 18 Drawing Figures

FIG. 1
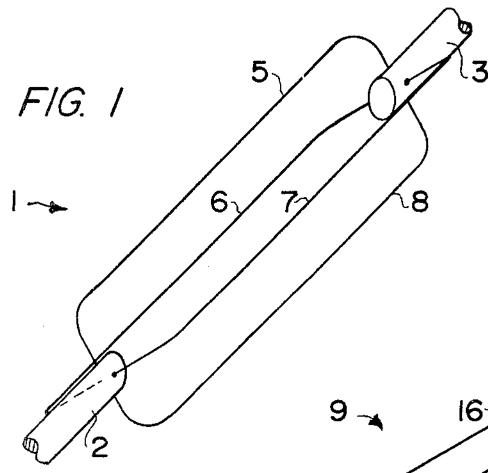
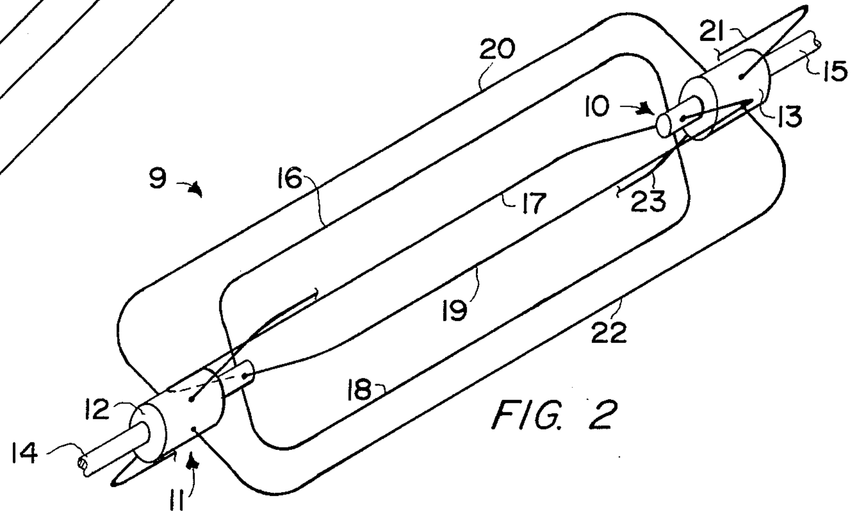
FIG. 2
FIG. 3
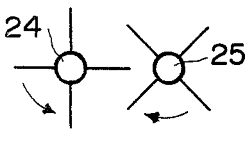
FIG. 4
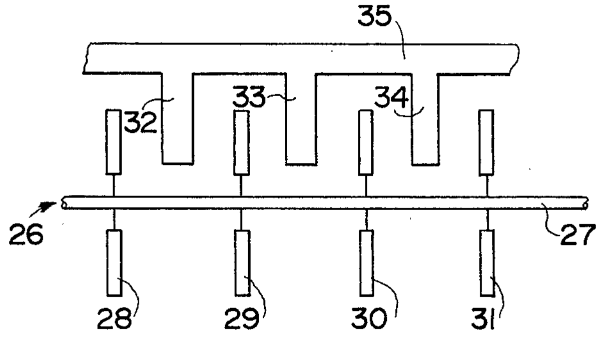

FIG. 5
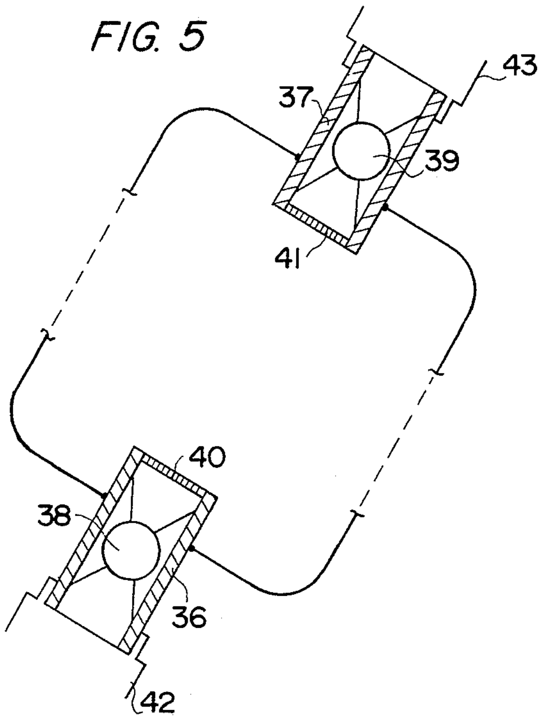
FIG. 7
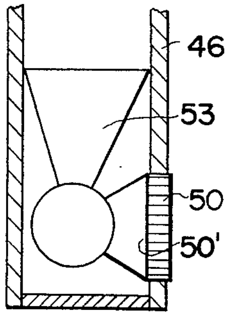
FIG. 6
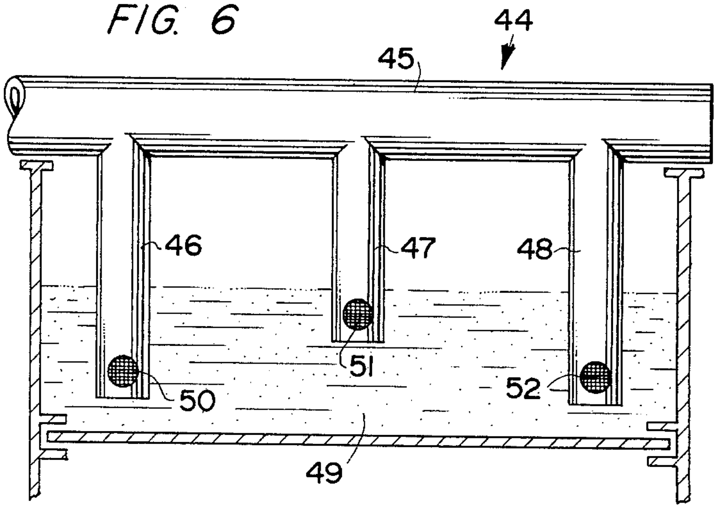
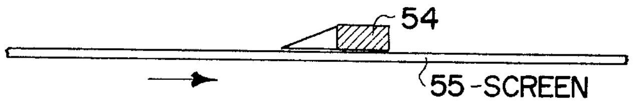
FIG. 8

METHOD FOR DRYING SLUDGE

BACKGROUND OF THE INVENTION

The invention relates to a method and apparatus for drying pasty, aqueous sludges, which result as wastes of industrial production and as by-products of municipal sewage treatment plants.

Pasty and aqueous sludges, in this context, have a solid matter content which generally exceeds 15% by weight. Normally, the solid matter proportion would be within the range of about 15% to 18% by weight. In many instances, industrial and municipal sludges are involved which have been subjected to a preliminary water withdrawal and which accumulate in large quantities. Recently, the removal of these sludges has become a great problem. Removal shall not only be made very quickly, but also with the smallest possible energy input, whereby valuable residues shall not be destroyed. If possible, the residues are to be recycled as raw materials into the economic process in order to save energy and raw materials.

Thus, the invention is concerned not only with a process for drying pasty, aqueous sludges, but in a more specific sense also with a process for producing certain raw materials from specific waste sludges of municipal or industrial treatment plants, such as sewage treatment plants.

Without any restriction, such production includes, for example, the manufacture of solid fuels from aqueous oil sludges, the production of pigments from aqueous paint, varnish and metal oxide sludges, and the production of fertilizers from waste sludges containing nutritive, feed and/or faecal substances.

In the production of fertilizers, especially of biological compost, it may be advantageous to add to the starting sludges a certain percentage of specific organic waster sludges as a binding agent to improve the adhesion of the individual solid particles to each other. According to the invention, these binding agents may be particularly milk and/or molasses sludges available from the dairy and sugar industries.

Waste sludges mixed with such specific binding agent sludges, which are dried or concentrated according to the invention, may be easily processed further to form slab-shaped or sheet type products which may be stored in a particularly space-saving manner.

The structure or composition of the sludges may be of the most varied types. In particular the sludges may contain pressed sugar beet cossettes or pulp, whereby it is the objective to obtain dry, storable, pressed sugar beet cossettes to be used as animal feed.

OBJECTS OF THE INVENTION

In view of the above it is the aim of the invention to achieve the following objects singly or in combination:

- to treat for removal pasty, aqueous sludges with a minimum of energy consumption, and without the addition of chemicals, whereby the resulting products shall be suitable as raw materials, if desired;
- to provide an apparatus for performing the present method, especially for substantially increasing the accessability of a drying gas into the sludge for increasing the drying efficiency;
- to improve the absorption of moisture from the sludge into a drying gas;
- to repeatedly increase and decrease the total surface area of the sludge accessible to the drying gas;
- to utilize industrial exhaust gases especially warm exhaust gases for the drying of sludge whereby harmful exhaust gas components may be absorbed by the drying sludges; and
- to adapt the apparatus for performing the present methods to various local requirements such as the type of sludge, and the intended end use of the dried sludge.

SUMMARY OF THE INVENTION

According to the invention, the above objectives are achieved by a sludge drying method wherein the individual sludge particles are subjected to an intense motion for achieving an optimal loosening effect and wherein simultaneously with the loosening and/or directly after the loosening, almost dry or pre-dried gases are pressure-fed into the sludge for absorbing the moisture, whereupon the wet gases enriched with moisture are removed from the sludge.

The foregoing method is best performed by an apparatus according to the invention which comprises at least one moving sludge agitating member, whereby the intense motion of the sludge particles is brought about largely by stirring, circulating or whirling the sludge. This sludge agitating member may be a stirrer-type, reel-type or basket-type member, which is equipped with a drive or is put into motion by the moving sludge. To achieve an optimum mixing of the sludge, two or more sludge agitating members may rotate in opposite directions. Basket-type sludge agitating members having parallel axes of rotation may be arranged so close to one another that these members mesh like gear wheels without touching each other. A rotating sludge stirring member may interact with stationary elements which put up a resistance against the moving sludge particles. In addition to the rotating motion, one or more of the sludge agitating members may perform a to-and-fro motion and/or an up-and-down motion.

According to a modification of the method of the invention a flat layer of sludge spread on a substantially plane bottom is continuously stirred up by mechanical means for the purpose of an optimal surface enlargement followed by mechanical compression to prepare the sludge for a renewed, optimum stirrability and to expose new surfaces. During such surface enlarging and compressing sludge treatments which are performed in continuously repeating sequences a moisture-absorbing current of gas acts under pressure upon all the sludge surfaces.

The just mentioned sequential surface enlargement and reduction or compression is best performed by an apparatus according to the invention which comprises, for the purpose of enlarging the surface area of the sludge layer, plough- or scraper-shaped implements, and for the purpose of re-compressing the sludge, roller-type implements, whereby these implements preferably move relative to the bottom of a treatment container.

The construction and the type of motion of the sludge agitating members as well as their speed are mainly determined by the kind of sludge to be treated, by its consistency, and by the height or thickness of the sludge layer to be treated. The main purpose of the sludge agitators is to crack the individual sludge particles to a substantial extent so that the supplied dry gases, especially warm dry exhaust air, may absorb the liquid clinging to the sludge particles. The sludge agitators are to prevent, in particular, that in the drying process, individual moisture nests of sludge or accumulations of sludge are left over, which could considerably reduce the quality of the dried sludge or even jeopardize its intended use.

BRIEF FIGURE DESCRIPTION

In order that the invention may be clearly understood, it will now be described, by way of example, with reference to the accompanying drawings, wherein:

FIG. 1 shows a sludge agitator according to the invention;

FIG. 2 shows another sludge agitator according to the invention;

FIG. 3 shows an agitating unit according to the invention comprising two agitating members;

FIG. 4 shows a further sludge agitator according to the invention;

FIG. 5 shows a sludge agitator according to the invention in combination with a sludge aerator;

FIG. 6 shows a sludge aerating device according to the invention;

FIG. 7 shows, on a somewhat enlarged scale, part of the device according to FIG. 6;

FIG. 8 shows a bottom scraping device according to the invention;

DETAILED DESCRIPTION OF PREFERRED EXAMPLE EMBODIMENTS AND OF THE BEST MODE

Figure 9:
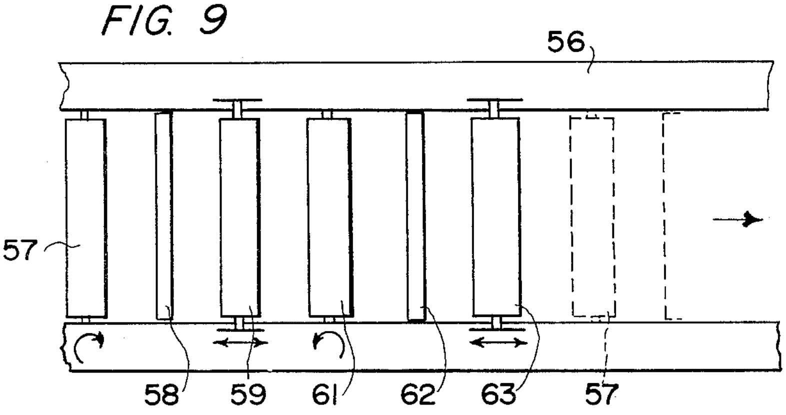
FIG. 9 is a diagrammatic top plan view of a sludge drying installation according to the invention with parts broken away for simplifying the illustration.

FIG. 1 is a perspective representation of the sludge agitator 1. Two coaxial shaft stubs 2 and 3 carry four U-shaped rods 5 to 8 staggered by 90° to one another. The shaft stubs 2 and 3 may, for example, be replaced by a continuous shaft. Instead of four U-rods, only two or three or even more than four such rods may be provided, which are preferably evenly distributed on the circumference.

The sludge stirrer 1 dips into the layer of sludge fed into a flat trough and is driven at any selectable speed in order to intensely agitate the sludge.

FIG. 2 is a perspective view of another sludge agitator 9 comprising an inner stirring or agitating element 10 and an outer stirring or agitating element 11. The inner stirring element 10 essentially corresponds to the sludge stirrer according to FIG. 1. The outer stirring element 11 has two hollow shaft stubs 12 and 13, through which two further shaft stubs 14 and 15 are fitted with a certain play or clearance. Four U-shaped rods 16 to 19 staggered by 90° to one another are secured to the two shaft stubs 14 and 15. Four further U-shaped rods 20 to 23 also staggered by 90° to one another are secured to the hollow shaft stubs 12 and 13. The rods 21 and 23 are being shown cut off to simplify the illustration. The rods of the outer stirring element 11 are bent so that the respective cage has a diameter larger than the diameter of the cage formed by the rods of the inner stirring element 10. The direction of rotation of the inner stirring element 10 is opposite to that of the outer stirring element 11, which causes an intense whirling of the sludge.

FIG. 3 shows two sludge agitators 24 and 25, both of which are constructed like the sludge agitators according to FIG. 1. The parallel agitator axes are relatively closely spaced from each other. The two cages of the sludge agitators 24, 25 are staggered to one another by 45° so that the rods forming these cages do not touch when they are rotated preferably in opposite directions to achieve an intense whirling of the sludge.

FIG. 4 shows another sludge agitator 25 with water-wheel-shaped paddles 28 to 31 attached to a shaft 27. The paddles comprise, for example, four single paddles arranged crosswise. Rigid resistance elements 32, 33, 34, which are secured to a fixed beam 35 forming part of an agitating container, not shown, extend from above into the space between the paddles. When the sludge agitator 26 rotates, the resistance elements 32, 33, 34 create a resistance to the flow of the moving sludge particles, thus considerably enhancing the intensity of sludge whirling. The shape of the paddles and resistance elements conforms to the type of sludge that is being treated.

While the sludge agitators according to FIGS. 1 to 4 give general suggestions for an intense sludge agitating or sludge whirling without feeding pressure gases into the sludge, the sectional view of FIG. 5 shows a sludge agitator according to FIG. 1 or FIG. 3, wherein the hollow shaft stubs 36 and 37 house fans 38 and 39 for feeding the drawn-in, dry gases under pressure into the sludge. The sludge facing ends of the shaft stubs are covered with strainer screens 40 and 41. Pipes or hoses 42 and 43 are connected to the opposite ends of the shaft stubs for supplying dry gases through couplings, not shown, into the sludge.

By means of the sludge stirrers according to FIGS. 3 or 5 of the invention, the sludge is not only whirled intensely, but it is also aerated at the same time with the dry pressurized gas.

The sludge agitators of FIG. 4 may also be used for intensifying sludge aeration, if the beam 35 and the resistance elements 32 to 34 are hollow and if the resistance elements are provided with fans for feeding drawn-in, dry gases into the whirled sludge through openings with appropriate strainer screens. In this case the hollow beam would be connected to a gas supply pipe by conventional means.

FIG. 6 shows a gas feeder or sludge aerator 44, which follows one or more sludge agitators, for example, according to FIGS. 1 to 3. The aerator comprises a stationary main pipe 45 connected to an exhaust gas source. Several pipes, for example, three pipes 46 to 48 branch off from the main pipe 45 and dip into the sludge layer 49. These pipes have openings 50 to 52, through which the dry gases are pressed into the sludge by separate fans in the pipes 46 to 48. The openings 50 to 52 are located at different levels in the sludge. The positions of the openings, their diameters and the gas pressure are determined by the type of sludge to be treated. The openings are provided with strainers, the mesh sizes or perforations of which are also selected with regard to the sludge type.

FIG. 7 is a schematic illustration of the arrangement of a fan in the pipe directly in front of the opening 50. It will be noted that the sludge aerator according to FIG. 6 can operate together with the sludge agitator according to FIG. 4. It may be advantageous to arrange the aerator 44 in a horizontally and/or vertically displaceable manner. It may also be advantageous to use an aerator of the rotatable type. In such an embodiment the pipes 46 to 48 extend outwardly like spokes from the central main pipe 45 forming a hollow shaft. The number of spoke-type aerating pipes would depend on the kind of sludge to be treated.

FIG. 8 is a sectional view of a sludge scraper 54 arranged closely above the sludge carrying bottom 55 for preventing sludge from settling on or clinging to the bottom, which may be constructed as a screen and which is being moved in the direction of the arrow relative to the stationary sludge scraper 54. Such sludge scrapers are necessary for certain types of sludges and are provided downstream of the sludge agitators and/or sludge aerators as viewed in the flow or movement direction of the sludge.

The shape of the individual implements, as shown schematically in the above figures, for sludge whirling, sludge aeration and bottom scraping depends mainly on the nature of the sludge, its composition and the thickness of the sludge layer 49. In view of the above disclosure, a person skilled in the art will be enabled to adapt these implements to the respective purpose in an optimal manner.

FIG. 9 is a top view of a sludge drying installation according to the invention comprising a longitudinal trough into which the sludge is fed. At right angles to the longitudinal trough there are successively arranged a sludge agitator 57, a bottom scraper 58 and a sludge aerator 59, followed in turn by a sludge agitator 61, a bottom scraper 62 and a sludge aerator 63, and so on. When the sludge carrying bottom is movable the sludge stirrers preferably rotate in a direction opposite to the direction of sludge movement, whereas the sludge aerators in the example can be moved to and fro horizontally. The bottom scrapers are fixed.

Figure 10:
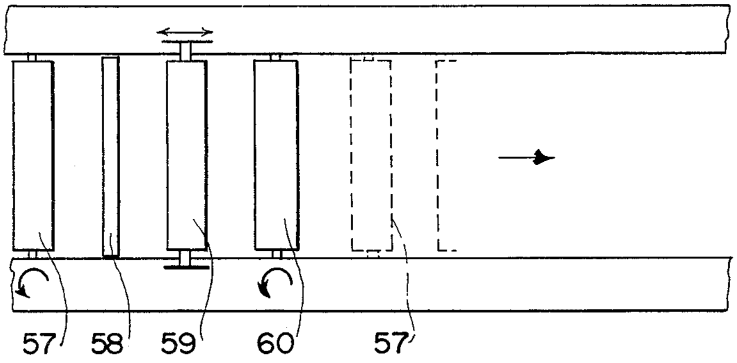
FIG. 10 is a diagrammatic plan view similar to FIG. 9, of another sludge drying installation according to the invention.

FIG. 10 is a top view of a sludge drying installation according to the invention, wherein each sludge aerator 59 is followed by a roller-type sludge compressor 60, which will be described below in greater detail. Due to the continuous alternation of intense sludge motion or sludge stirring and sludge compression, newly formed sludge surfaces are exposed again and again to the sludge aeration. The adjustable pressure of the sludge rollers for compressing the stirred-up sludge depends on the nature of the sludge being treated. In addition, the sludge rollers may contribute to a sludge surface aeration.

Figure 11:
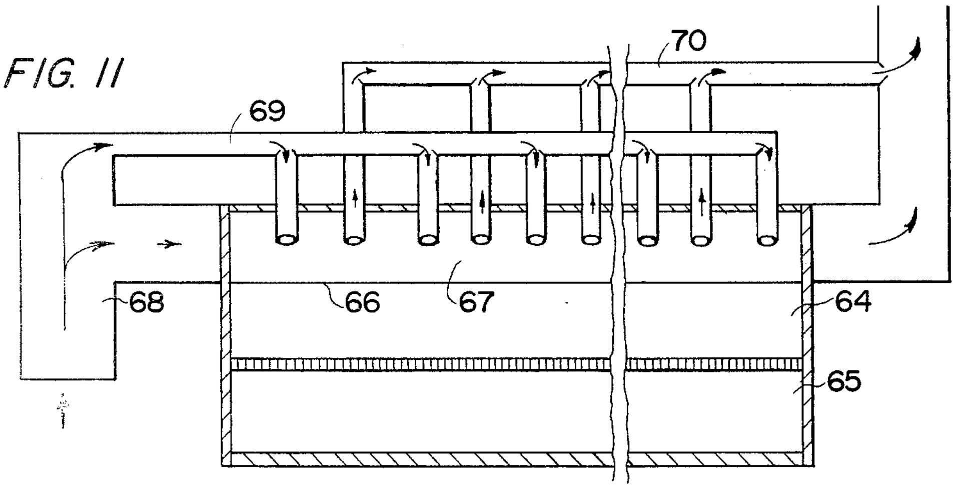
FIG. 11 is a diagrammatic side view of a sludge drying installation according to the invention with feed and discharge means for industrial exhaust gases used for drying.

FIG. 11 is a side view of a sludge drying installation according to the invention. A totally encased longitudinal trough 64 has a moving screen bottom 65 which carries a sludge layer 66 of uniform thickness. The encased longitudinal trough 64 houses the different tools or implements arranged, for example, in accordance with FIG. 9 or FIG. 10. The space 67 above the sludge layer 66 is connected to a pressure gas source 68 for dry, warm industrial exhaust gases or industrial exhaust air. The individual sludge aerators are also connected to the pressure gas source through a piping system 69. Above the sludge layer 66 and distributed over the longitudinal trough 64 there are openings connected to an exhaust gas piping system 70, through which the gases saturated with moisture from the sludge are removed or drawn off. The relatively low suction pressure is adjusted according to respective operating conditions.

The velocities of the dry gases fed to the sludge should be as high as possible and preferably between 6 to 15 m/sec. The dry gases should preferably have a moisture content between 1% and 10%. The gas temperatures should be between 35° C. and 100° C., preferably about 70° C. However, the temperatures may also exceed 100° C., e.g. up to 200° C. In this context, dry gases are understood to be such gases which under the given conditions are capable of absorbing considerable amounts of moisture from the sludge. It is an advantage of the invention that the individual tools of a sludge drying installation according to the invention may be exchanged or operationally adjusted to adapt them to a wide range of different sludge conditions.

A sludge drying installation having a circular trough may be constructed substantially similarly as described above, whereby the individual tools for whirling, aerating and compressing the sludge and for preventing sludge deposits extend radially outwardly from the center of the circular trough.

Figure 12:
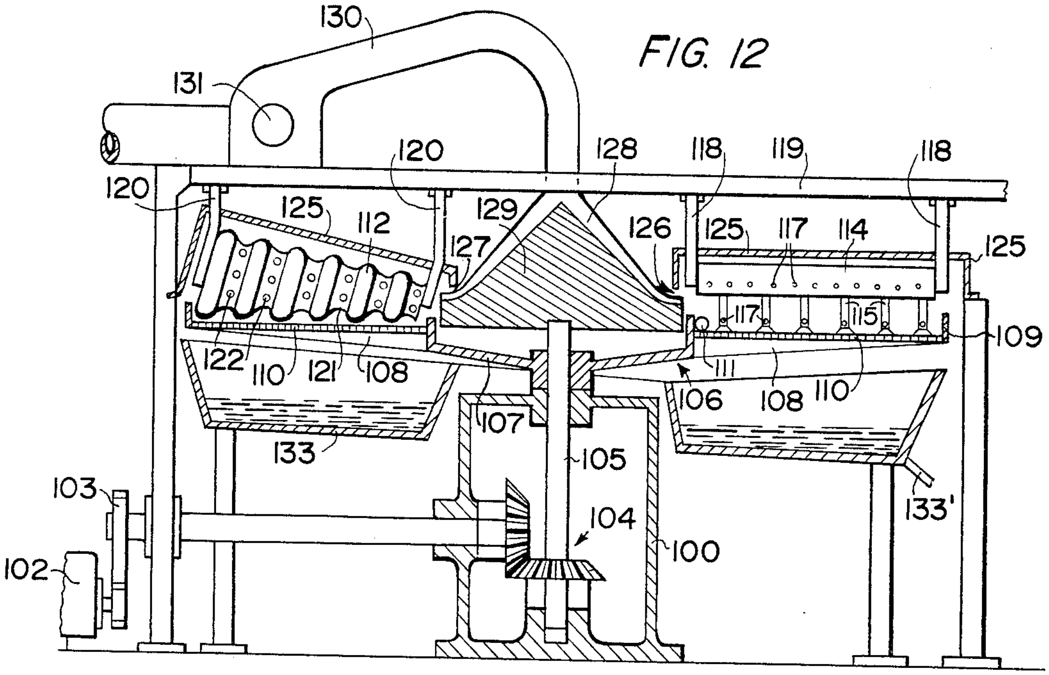
FIG. 12 is a sectional view of an apparatus according to the invention for sequentially increasing and decreasing the surface area of the sludge.

FIG. 12 is a somewhat simplified schematic sectional view through another practical example of an apparatus for performing the process according to the invention, whereby the basic construction of the apparatus of the invention shall be illustrated.

The free end of a shaft 105 projecting out of a casing 100, in which the shaft is mounted vertically carries a wheel-shaped screen bottom support 106. The shaft 105 is driven by a motor 102 through gears 103, 104. Spokes 108 extend substantially horizontally from the central cupped hub 107. The spokes 108 are rigidly connected to a rim-like, profiled ring 109 bordering the screen bottom support 106 radially outwardly. The spokes 108 support individual screen segments 110 or a circular screen. The hub 107 may be made by deep drawing or the like.

In case the sludge to be concentrated or dried has been subjected to a preliminary water removal and if it has such a consistency that no water or just insignificant amounts of water may flow off through the holes of the screen, it is possible to provide—instead of a screen bottom—a plate or sheet metal bottom which does not have any perforations. Such an imperforated bottom may also comprise individual segments held between the spokes 108, or it may comprise a solid ring plate resting on the spokes 108.

The outer profiled ring 109 and the outer edge 111 of the hub 107 project over the screen or plate bottom to such an extent that the bottom may be charged with a layer of sludge which, subject to the composition and consistency of the sludge, may be 5 cm to 20 cm thick. In some cases, however, it may be advantageous to have a sludge layer which is up to 50 cm thick.

Above the bottom or screen suport 106 there are alternately arranged, according to the invention, two different implements 112, 113, which move relative to the sludge layer to repeatedly intensely agitate and re-compress the sludge layer. Thus, new sludge surfaces are continuously exposed and subjected to an intense aeration with warm gas, especially warm industrial exhaust air, in order to extract water from the sludge in a most rapid and intense manner.

Figure 15:
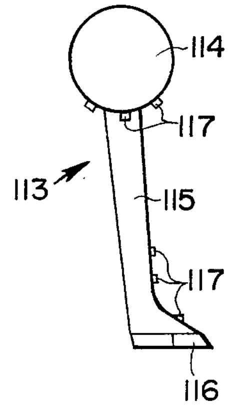
FIG. 15 is an end view of the tool according to FIG. 14.
Figure 14:
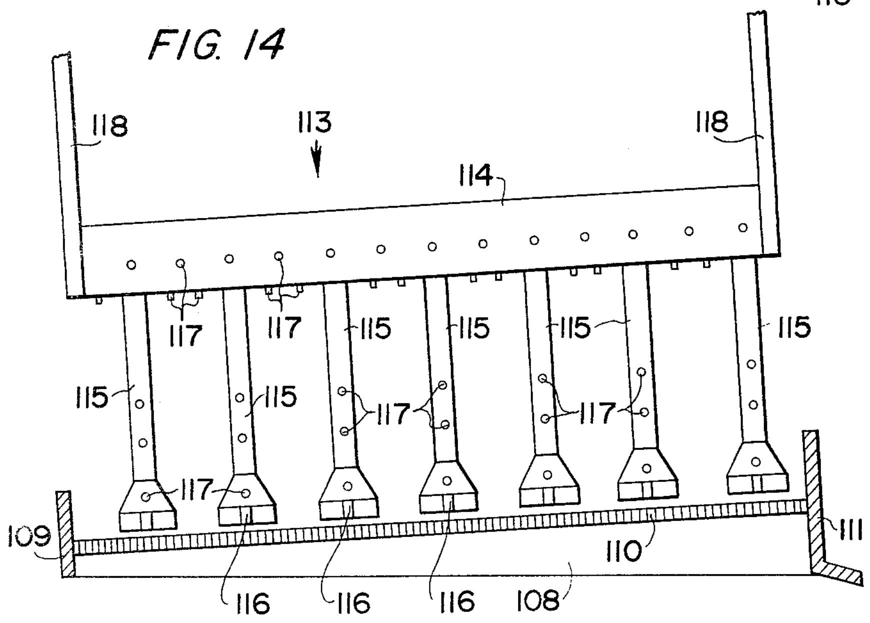
FIG. 14 is a front view of a single tool above the sludge bottom according to FIG. 12.

One of the implements is a plough-shaped or scraper-shaped device 113, which is shown in greater detail in FIGS. 14 and 15. The scraper 113 comprises substantially a tubular member 114 extending radially between the outer profiled ring 109 and the edge 111 of the hub 107. Evenly spaced pipes or hollow rods 115 branch off from the tubular member 114 which extends horizontally above the screen bottom support 106 at a certain level. The rods 115 dip into the sludge layer with ends 116 having a plough shaped or scraper-shaped configuration and arranged on or closely above the screen bottom 108. Nozzle-type openings 117 are provided at the underside of the tubular member 114, in the lower area of the hollow rods 115 and in the end sections 116 coming into contact with the sludge. During operation of the apparatus according to the invention the openings 117 discharge warm industrial exhaust gases under pressure onto and into the sludge. For this purpose, the tubular member 114 is connected to a fan, not shown.

Figure 13:
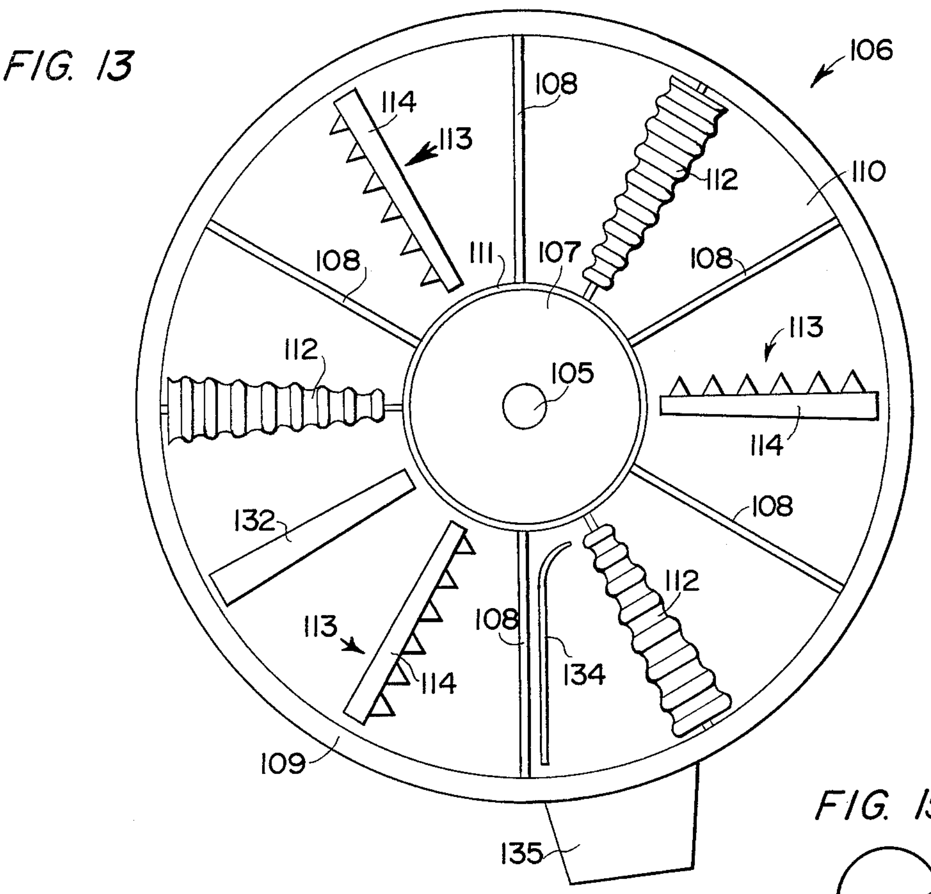
FIG. 13 is a top view of the sludge bottom of the apparatus shown in FIG. 12.

In this example the apparatus according to FIG. 12 has, for example, three conforming scraper devices 113 with the tubular members 114 spaced at an angle of 120° from one another as shown in FIG. 13. The tubular members 114 are carried by brackets 118, secured to a frame 119 above the screen bottom support 106, which is shown schematically in FIG. 1 for a tubular member 114. All of the plough-shaped or scraper-shaped end sections 116 of the scraper devices 113 point in the same direction. However, the end sections 116 of two adjacent scraper devices 113 are arranged in a radially staggered manner so that when the screen bottom support rotates they do not move in the same circular tracks, but in staggered tracks.

The other implement 112, however, is a roller-type device 112 which, just like a plough-shaped or scraper-shaped implement 113, extends radially between the outer profiled ring 109 and the edge 111 of the hub 107. In the example, three rollers 112 are spaced at an angle of 120° to one another and between the scrapers 113 so that a scraper 113 is always followed by a roller 112, and vice versa as shown in FIG. 13.

The rollers 112 are rotatably carried on brackets 120 secured to the frame 119. It is an advantage that the height of the rollers 112 above the screen bottom support 106 may be adjusted, for example, by providing a series of holes in the brackets 120 for securing the latter to the frame 119. The distance of the rollers 112 from the screen bottom support 106 is such that the sludge stirred up by a scraper 113 is compressed again by a following roller 112 to such a degree that the sludge can then be stirred up again by the following scraper as the structure is rotated by the shaft 105. The rollers 112, therefore, do not compress the sludge for the purpose of pressing out liquid, but rather for the purpose of compressing or compacting it to such a degree that subsequent renewed loosening of the sludge by a scraper 116 exposes new sludge surfaces to warm exhaust gas.

It has been found according to the invention that by continuous and sequential loosening and compressing actions new sludge surfaces are subjected to an intense aeration by the warm exhaust gas, which results in surprisingly short drying periods.

Figure 16:
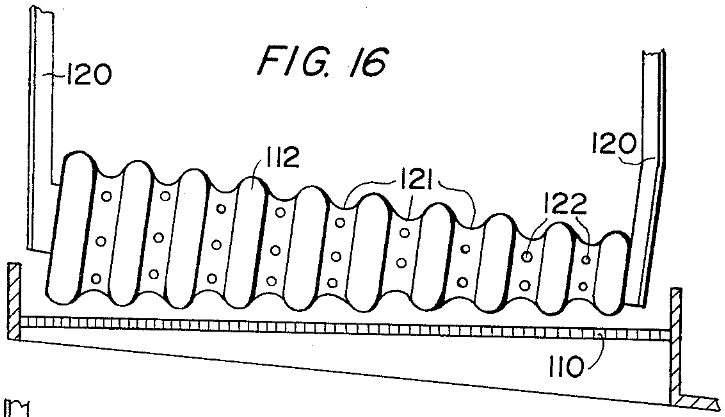
FIG. 16 is a front view of another tool above the sludge bottom according to FIG. 12.
Figure 17:
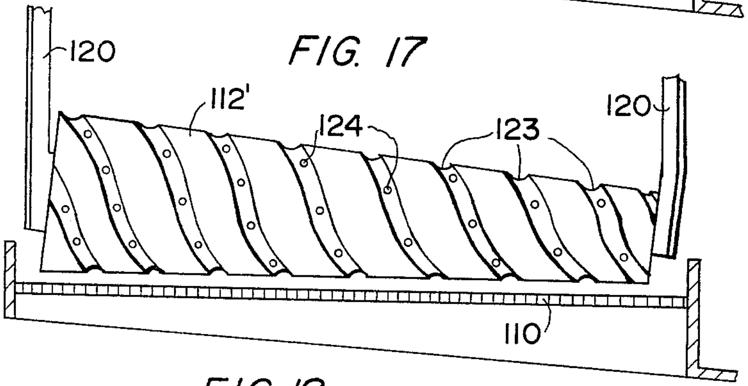
FIG. 17 shows a modified version of the tool according to FIG. 16.

It is advantageous to groove the surface of the rollers 112 and that nozzles are provided in the grooves for discharging the warm industrial exhaust gases under pressure. For this purpose, the roller-type implements are hollow and are connected to fans (not shown). The grooves 121 and nozzles 122 are best seen in FIGS. 16 and 17.

The outer roller profile may comprise a plurality of said circumferential grooves 121 extending in radial planes and with certain spacings therebetween. The nozzle openings 122 are distributed in the circumferential grooves 121 as is shown in FIGS. 16 and 17. Instead of such circumferential grooves, the roller profile may also be formed by several parallel grooves 123, extending around the circumference of the roller 112 like a worm gear spiral. Nozzle openings 124 are also provided in the grooves 123 with certain spacings from nozzle to nozzle.

It is advantageous that the profiles of two sequentially following rollers 112 or 112' do not move in the same sludge tracks, but that they cross or are staggered. This feature even enhances the intense and continuous turning over of the sludge to expose new sludge surfaces to the drying gas.

The warm exhaust gas or air is fed directly through the nozzles 117, 122, 124 in the tools 112, 112', 113 to the exposed sludge surfaces, whereby an intensive drying is achieved.

The grooves are constructed in such a manner and the nozzles in the grooves are arranged in such positions that nozzles cannot be clogged up by the sludge. In addition, the gas pressure should preferably be so high that clogging by the sludge is practically prevented.

What has been said of the arrangement of the nozzles 122, 124 in the rollers 112, 112' also applies analogously to the nozzles 117 in the scraper device 113. The nozzles 117 may also be located in indents or recesses which are arranged or constructed in such an advantageous manner that the sludge passing the indents or recesses is conducted past the recesses without filling them.

Rapid drying of the sludge is even accelerated by the fact that the sludge layer is covered by plates 125 or the like, located as close as possible to the sludge and also covering the tools 112 and 113, so that a substantially closed drying compartment is formed, which has a central opening 126 through which warm exhaust gas is fed under pressure into said compartment. The exhaust gases pass across the sludge surface and leave through openings at the outer profiled edge 109. Here, gas ducts (not shown) may be provided which lead the emerging gas under the screen bottoms, before it escapes into the open air.

According to FIG. 12, the duct for supplying gas into the space under the cover 125 is such that the outwardly bent edge of a bell or funnel 128 extends under the central opening 126 of the cover plates 125. A cone 129 in the bell 128 defines a duct connected through a pipe 120 to a fan 131 for pressing the warm exhaust gases into the pipe 130.

Figure 18:
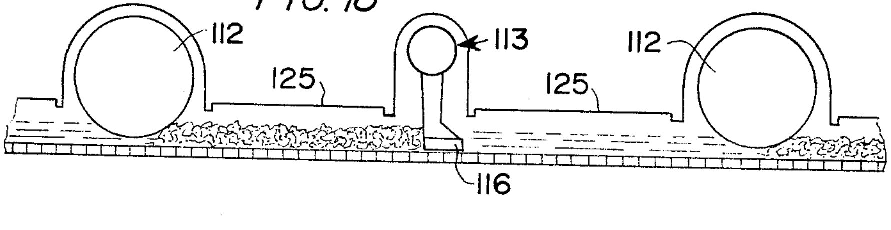
FIG. 18 is a partial, sectional view of the apparatus according to FIG. 12 to illustrate the sludge bottom cover.

FIG. 18 is a sectional view, at right angles to the axis, of a scraper device 113 between two roller-type implements 112. FIG. 18 clearly shows that the cover plates 125 also enclose the tools 112 and 113.

The sludge may be applied to the bottom in different ways. In the example according to FIG. 12 the cover 125 has a slot 132, shown in FIG. 13 through which the sludge is charged into the compartment and distributed uniformly. There are a number of ways and means to charge the sludge into the slot 132 for example, a screw conveyor or similar distributor arranged above the slot may be used.

According to FIG. 12 a trough or chute 133 is arranged beneath the screen bottom 110 to collect any water flowing through the bottom or over the bottom edges. The trough 133 is unnecessary when solid bottom plates are used instead of the screen bottoms for sludge which no longer gives off liquids through a screen.

The apparatus according to the invention with specific reference to FIG. 12 operates as follows. However, the devices of the other figures operate substantially in the same manner.

Switching on the motor 102 sets the gears 103, 104 in motion whereby the shaft 105 with the screen bottom support 106 is rotated relatively slowly. Pasty, aqueous sludge is uniformly distributed onto the screen bottom support 106 by a charging device (not shown) through the slot 132 and the sludge is maintained to form a layer of a certain thickness between 5 cm and 20 cm above the screen bottom support 106. Then the aerating device is switched on. The sludge is dried during the continuous rotation of the screen bottom support 106 in one direction and in opposition to the fixed scrapers 113 which dip into and thus stir up and agitate the sludge. The warm exhaust gases are discharged under pressure from the nozzles 117 and intensely circulate about the exposed sludge surfaces thereby absorbing moisture from the sludge.

The position of the freely rotatable rollers 112 above the screen bottom support 106 is such that they exert a certain pressure on the stirred-up sludge to thus compress or compact the sludge again, without, however, subjecting the sludge to higher pressures such as are applied, for examples, in presses for dewatering wet materials. The compressed sludge is then stirred up again by a scraper 113, thus exposing new sludge surfaces to an intense gas aeration.

When the sludge is compacted by the rollers 112, warm exhaust gases are fed to the sludge surface through the nozzle 122 or 124. In general, the roller 112 need not have a drive of their own, because the contact with the sludge on the rotating screen bottom plate 110 rotates the rollers 112.

Any water trickling through the screen 110 into the trough 133 is removed through an outlet spout 133'. The screen 110 and the furrow trough are not required, however, when due to the specific sludge properties such as water separation does not take place. As was mentioned above, the screens 110 may then be replaced by unperforated plates.

In addition to the sludge aeration through the nozzles 117, 122, 124 in the implements 112, 113, an intense aeration of the surfaces of the sludge is achieved by the aerating bell 128 which reaches with its outer rim through a gap 126 under the cover plates 125. Thus, the warm exhaust gases are positively brought into an intense contact with the sludge surface. When the sludge has been dried to a sufficient degree, a scraper 134 (FIG. 13) is lowered down to the bottom 110 for discharging the material through a chute.

The invention is not limited to the practical example according to FIG. 12. For example, the same elements may be arranged again in a device having several stores whereby two or more screen bottom supports 106 are arranged vertically one beneath the other. In such an arrangement the sludge may be dried in stages or so-called fractions. In such a case it may be advisable to provide the implements 112 and 113 above the uppermost screen bottom plate only. The second fraction can possibly be added again to the first fraction. The invention does not preclude, however, that the second fraction is also dried by implements 112, 113 as shown in FIG. 12.

The operation of a longitudinal drying apparatus as disclosed above in FIGS. 9 and 10, for example, is substantially the same as that of the circular apparatus according to FIG. 12. In the longitudinal apparatus it is also advisable that the screen bottom support is moved relative to the tools. Whereas in the circular drying apparatus according to FIG. 12 the screen bottom support is rotated, the screen bottom support in the longitudinal apparatus may be moved back and forth, and it is advisable that the scraper is designed in such a way that during the back and forth motion the scrapers act upon the sludge in the same manner.

The invention is also not limited to a batch-wise operation. Continuously operating drying devices for performing the process according to the invention may also be constructed. In such a case, the bottom to carry the sludge may be a helical winding around a shaft provided with a drive. The implements 112, 113, may be secured to brackets radially extending from the outer edge of the helix to the inside, the brackets being held by at least one endless chain. The implements interact alongside a vertical section of the endless chain with the spiral in the manner of a worm drive.

Such a worm-type drying apparatus could have such a height that the sludge charged at the upper end of the spiral or helix, at a slow rotation of the spiral, may be discharged at the lower end at a sufficient degree of dryness.

The invention shows that by means of relatively simple devices it is possible, without high expenses and with energy-saving utilization of warm exhaust gases, to dry pasty, aqueous sludges in an unprecedented way within a sufficiently short time. In many cases the dried sludges can be put to further use, which does not only save energy but also considerable quantities of raw materials.

In the light of the foregoing disclosure, it will be appreciated that for an optimally rapid drying it is necessary to intensively loosen the sludge particles or to move the sludge particles and to also intensively aerate the loosened, separated sludge particles by means of the supplied dry gas. Preferably, the gas supplied for the aeration has such a low moisture content and such a temperature and the gas is fed at such a speed or at such a pressure into the sludge and/or onto the sludge surfaces that the gas absorbs a maximum amount of moisture, which is decisive for quickly drying the sludge.

Aeration of the sludge with dry gasses under pressure takes place preferably at the moment of the most intense sludge agitation or immediately thereafter, before the individual sludge particles may settle again to thereby trap moisture which is not directly accessible to the dry pressure gases which are being introduced.

Hence, it follows that it can be advantageous to introduce the dry pressure gases through the sludge agitating members and/or through the stationary resistance elements interacting with the agitating members. It may be sufficient, however, to introduce the dry pressure gases into the sludge and/or direct the gases at least onto the surfaces of the sludge through stationary and/or moving tubular gas feeding members arranged downstream of the sludge stirring members as viewed in the direction of sludge movement.

Under certain circumstances, for example, when the sludge is agitated intensely at successive intervals or spacings by the sequentially arranged sludge agitating members, it may be sufficient to subject the continuously exposed new sludge surfaces to an intense surface drying by directing dry pressure gases of a sufficiently high temperature onto the sludge surfaces. However, in many instances, such surface drying alone of the intensely agitated sludges has been found to be insufficient and considerably quicker drying rates could be achieved if the sufficiently warmed pressure gases are introduced into the sludge.

For this purpose, the gas feeding members preferably comprise a plurality of tubular members branching off from a central pipe as shown in FIG. 6. Each tubular member has at least one nozzle-type gas outlet openings 50, 51, 52. Each tubular members 46, 47, 48 is provided with a ventilator-type or compressor-type fan 53 arranged near the gas outlet opening. The gas pressure at these outlet openings which have a diameter of 30 to 80 mm, for example, is selected to be sufficiently higher than the sludge pressure acting on the gas outlet openings 50, 51, 52. It is advisable that the gas outlet openings be provided with strainer screens 50' of selectable mesh sizes.

The moving tubular gas feeding members which are separated from the sludge agitating members may perform a back-and-forth motion and/or an up-and-down motion and/or a rotational motion about an axis.

In order that the aeration of the sludge with the dry and warm gas may take place at the instant of the most intense sludge loosening, it may be especially advantageous for certain types of sludges to combine the stationary or moving gas feeding members with at least one sludge agitating member to provide a sludge agitating and gas feeding unit. In such a combination unit the gas feeding components interact directly with the sludge agitating components, and the gas feeding components also perform sludge stirring work.

It is an advantage that the position or the depth of immersion of the gas outlet openings and their free sectional area may be adjusted in accordance with the kind of sludge involved, its consistency and/or its thickness on the screen 110 or support 106.

In many cases it will be advisable to arrange the axes of rotation of the sludge agitating members and/or of the gas feeding members or the axes of rotation of the combined units at right angles to the direction of sludge transport and in a substantially horizontal position. According to the kind of sludge and the prevailing conditions it may also be advantageous, however, to arrange the axes of rotation in other positions, e.g., in the direction of the sludge movement and also substantially horizontally. The axes of rotation may also be arranged in a vertical position or they may be inclined relative to the vertical position as is the case with stirring agitators.

For different types of sludges it is advantageous that following an intense agitation or loosening, the sludge is compressed again by means of one or more cylindrical tool arranged radially or in parallel as described above. This compressing contributes to considerably improving an immediately following loosening or agitating of the sludge. Such improvement is due to the fact that the alternation of compressing and loosening continuously exposes new sludge surfaces in certain types of sludges which may be subjected to an intense pressure gas aeration by warm dry gas. Depending on the type sludges that must be treated it may be advantageous to replace the scrapers 113 shown for example in FIG. 13 by at least one sludge agitator member as shown in FIGS. 1 to 5. These agitators may also be combined with compression rollers as shown in FIGS. 16 and 17.

In order to prevent the setting or clinging of sludge particles on the bottom support 106 or 65 it may be advantageous to provide at least one additional scraping element 134 which is moving relative to the sludge carrying bottom. Instead of such scraping elements, vibrating or shaking devices may be provided at the bottom, which prevent the settling of sludge particles and, at the same time, contribute to loosening the sludge. Such vibrating screens are well known in the art.

Based on the present teaching of intensively contacting as large a surface area as possible with the hot drying gases, it may be advantageous to use for an intense agitation of the sludge and for exposing the individual sludge particles to an aeration by warm pressures gases, one or more vibrators and/or ultrasonic probes in addition to the above described devices. The ultrasonic probes would dip into the sludge. Such vibrators and/or ultrasonic probes may also be used without the above described devices. It is advantageous that an intense sludge aeration takes place in the direct area of these vibrators and/or ultrasonic probes. The gas may be supplied through tubular vibrators.

The sludge carrying bottom may comprise at least one circular or longitudinal trough as described whereby the sludge agitating members, the gas feeding members and, if provided, the sludge compressing and bottom scraping members may extend radially outwardly from the trough center or in parallel to each other to form a row along the length of a longitudinal trough. In any event, these components will be successively and uniformly distributed over the trough surface.

Depending on the type of sludge, the bottom of the trough may be an unperforated plate or a screen regardless whether the trough is round or elongated. The bottom of a trough may move relative to the sludge agitating members, the gas feeding members and, if provided, relative to the sludge compressing and bottom scraping members. Thus, the circular trough together with its bottom may be rotated in one direction relative to the sludge handling implements about its axis until a charge of sludge has been dried to the degree required. In the longitudinal trough, a bottom section for one sludge charge is reciprocated until the charge has been dried to the degree required. The bottom can be an endless belt which at the two ends of the trough is alternately rolled on or off by two pulleys, alternately driven in opposite directions.

The drying efficiency is substantially increased if the trough is covered above the surface of the sludge as shown, for example, in FIG. 11 and if the free space inside the trough above the sludge surface is connected to at least one fan to feed in the dry pressure gas. Incidentally, the feed-in opening for the sludge such as the slot 132 is perferably closeable by a cover once the sludge has been filled into the apparatus. Within the area of the free inside space the trough has spaced openings to remove or exhaust the moist gas.

It is an essential advantage of the invention that it offers a surprisingly simple and practiceable way of utilizing hitherto unused energies contained in industrial exhaust gases for the rapid drying of sludges of any kind, which often are difficult to dispose of and for the conventional drying of which considerable amounts of primary energy are required. The sludges dried according to the invention have a degree of dryness which at last permits profitable further use for various purposes such as fertilizer production, feed production and the like. The industrial exhaust gases used so far for drying had to be purified several times before they could be given off to the open air. No such purification is necessary according to the invention. In many cases the use of such unpurified industrial exhaust gases considerably relieves the purification plants, because the harmful substances formerly separated from the exhaust gases are absorbed by the treated sludges, which is yet another advantage of the invention.

Although the invention has been described with reference to specific example embodiments, it is to be understood, that it is intended to cover all modifications and equivalents within the scope of the appended claims.

What is claimed is:

1. A method for continuously drying pasty, aqueous sludge, comprising the steps of continuously subjecting the sludge to an intense agitation by alternately subjecting the sludge particles to intense motions to enlarge the sludge surface, and to mechanical compression to reduce the sludge surface again for substantially loosening the individual sludge particles and for repeatedly bringing different sludge particles to the surface, pressure feeding drying gas into contact with the agitated sludge for absorbing the moisture from the sludge, and removing the gas enriched with moisture from the sludge, and wherein said pressure feeding of said drying gas is performed during said sludge compression whereby the dry pressurized gases are brought into surface contact with the sludge.

2. A method for continuously drying pasty, aqueous sludge, comprising the steps of spreading a flat layer of sludge on at least one substantially plane bottom, continuously subjecting the sludge to an intense agitation by alternately subjecting the sludge particles to intense motions to enlarge the sludge surface, and to mechanical compression to reduce the sludge surface again for substantially loosening the individual sludge particles and for repeatedly bringing different sludge particles to the surface, pressure feeding drying gas into contact with the agitated sludge for absorbing the moisture from the sludge, and removing the gas enriched with moisture from the sludge, said intense agitation comprising continuously agitating and mechanically compressing the sludge at sequentially arranged locations whereby the sludge surface is repeatedly increased and decreased by said agitating and mechanically compressing so that new sludge surfaces are being produced repeatedly, and wherein said pressure feeding of said drying gas is performed during said agitating and mechanically compressing so as to subject all sludge surfaces to a moisture absorbing gas flow under pressure.

3. The method of claim 1 or 2, wherein the drying gas is also pressure fed into contact with the sludge simultaneously with said step of intense motions.

4. The method of claim 1 or 2, wherein the drying gas is also pressure fed into contact with the sludge immediately following said step of intense motions and also before the renewed sludge compression.

5. The method of claim 1 or 2, wherein the drying gas has a temperature within the range from about 35° C. to about 200° C. to assure an optimal absorption of moisture from the sludge.

6. The method of claim 1 or 2, comprising using as said drying gas industrial exhaust gas or industrial exhaust steam.

7. The method of claim 1 or 2, for producing substantially solid fuels, wherein said sludge is an aqueous oil sludge.

8. The method of claim 1 or 2, for producing pigment raw materials, wherein said sludge is selected from the group consisting of aqueous paint sludge, varnish sludge, and metal oxide sludge.

9. The method of claim 1 or 2, for producing fertilizers, wherein said sludge is selected from the group consisting of nutritive sludge, animal feed sludge, organic sludge including faecal substances.

10. The method of claim 9, further comprising adding as a binding agent an aqueous milk and/or molasses sludge to the sludge being treated.

11. The method of claim 1 or 2, comprising using as said drying gas a warm or warmed industrial exhaust gas or exhaust gas mixture.

* * * * *